US012155224B2

United States Patent
Gradinger et al.

(10) Patent No.: US 12,155,224 B2
(45) Date of Patent: Nov. 26, 2024

(54) INDUCTIVE FAST CHARGER

(71) Applicant: ABB E-mobility B.V., Delft (NL)

(72) Inventors: Thomas Bernhard Gradinger, Aarau Rohr (CH); Gabriel Ignacio Ortiz, Zürich (CH); Uwe Drofenik, Zürich (CH); Ki-Bum Park, Fislisbach (CH); Bernhard Wunsch, Baden-Dättwil (CH)

(73) Assignee: ABB E-mobility B.V., Delft (NL)

( * ) Notice: Subject to any disclaimer, the term of this patent is extended or adjusted under 35 U.S.C. 154(b) by 70 days.

(21) Appl. No.: 17/975,711

(22) Filed: Oct. 28, 2022

(65) Prior Publication Data
US 2023/0051317 A1 Feb. 16, 2023

Related U.S. Application Data

(63) Continuation of application No. PCT/EP2021/060017, filed on Apr. 19, 2021.

(30) Foreign Application Priority Data

Apr. 30, 2020 (EP) ..................................... 20172456

(51) Int. Cl.
*H02J 50/10* (2016.01)
*H01F 27/24* (2006.01)
(Continued)

(52) U.S. Cl.
CPC .............. *H02J 50/10* (2016.02); *H01F 27/24* (2013.01); *H01F 27/306* (2013.01); *H01F 27/32* (2013.01);
(Continued)

(58) Field of Classification Search
CPC ........ H02J 50/10; H01F 27/24; H01F 27/306; H01F 27/32
See application file for complete search history.

(56) References Cited

U.S. PATENT DOCUMENTS 4,665,357 A 5/1987 Herbert
5,479,146 A 12/1995 Herbert
(Continued)

FOREIGN PATENT DOCUMENTS

DE 112010005649 T5 11/2013
EP 2824822 A1 1/2015
WO WO 2020/017082 A1 1/2020

OTHER PUBLICATIONS

Kolar et al., "Intelligent Solid State Transformers (SSTs) A Key Building Block of Future Smart Grid Systems," *Keynote speech at China Power System Society Conference*, 63 pp. (Nov. 18, 2011).
(Continued)

*Primary Examiner* — Jeffrey M Shin
(74) *Attorney, Agent, or Firm* — Leydig, Voit & Mayer, Ltd.

(57) ABSTRACT

A power electronic converter includes a plurality of converter cells, each comprising an inductive power transfer stage having a coupled inductor coupling first and second sides of the converter cell, wherein the inductor comprises a first winding around a first magnetic core and a second winding around a second magnetic core; wherein the first winding and the first magnetic core are separated from the second winding and the second magnetic core by a flat electric insulation layer that provides electric insulation between the first and second sides of the converter cell; wherein at least two of the coupled inductors are arranged so that their insulation layers form a single contiguous insulation layer.

20 Claims, 7 Drawing Sheets

(51) Int. Cl.
  *H01F 27/30* (2006.01)
  *H01F 27/32* (2006.01)
  *H02J 7/00* (2006.01)
(52) U.S. Cl.
  CPC ......... *H02J 7/0042* (2013.01); *H02J 2207/20* (2020.01)

(56) References Cited

U.S. PATENT DOCUMENTS

| | | |
|---|---|---|
| 2008/0116847 A1 | 5/2008 | Loke et al. |
| 2011/0005381 A1 | 1/2011 | Friedman et al. |
| 2012/0200170 A1 | 8/2012 | Sabo |
| 2012/0256585 A1 | 10/2012 | Partovi et al. |
| 2020/0119687 A1* | 4/2020 | Yu ........................ H01F 27/346 |

OTHER PUBLICATIONS

Lau, "Matrix Transformer Building Blocks for High Frequency Applications", *Presentation at APEC 2016 Workshop: Power Magnetics @ High Frequency—Solving the Black Magic!*, 48 pp. (Mar. 19, 2016).
European Patent Office, Extended European Search Report in European Patent Application No. 20172456.4, 8 pp. (Oct. 28, 2020).
European Patent Office, International Search Report in International Patent Application No. PCT/EP2021/060017, 3 pp. (Jul. 14, 2021).
European Patent Office, Written Opinion in International Patent Application No. PCT/EP2021/060017, 7 pp. (Jul. 14, 2021).

* cited by examiner

INDUCTIVE FAST CHARGER

CROSS-REFERENCE TO RELATED APPLICATIONS

This patent application claims priority to International Patent Application No. PCT/EP2021/060017, filed on Apr. 19, 2021, and to European Patent Application No. 20172456.4, filed on Apr. 30, 2020, each of which is incorporated herein in its entirety by reference.

FIELD OF THE DISCLOSURE

The present disclosure relates to a power electronic converter, a converter cell, a usage of a power electronic converter, a charger comprising a power electronic converter, and a wireless vehicle charging station.

BACKGROUND OF THE INVENTION

For electric-vehicle charging infrastructure connected to the medium voltage (MV) grid, in particular for fast car chargers, it is attractive to replace 50 or 60 Hz transformers by solid-state transformers (SSTs) using medium-frequency transformers (MFTs). The insulation requirements of the MV grid constitute a challenge, however, for the MFTs, in particular in case of low power MFT, volume, weight, and cost of converters based on medium- or high-frequency transformers have been very successful in low voltage (LV) applications, in particular in power supplies for electronic devices such as computers and laptops. In MV applications, the electric insulation poses a challenge to the attractiveness of MFTs. While the transformer core shrinks with increasing frequency, this is not the case for the insulation distances. For high frequency and low power per transformer, the transformer size is dominated by the insulation distances between LV and high voltage (HV) winding, and between HV winding and core.

BRIEF SUMMARY OF THE INVENTION

The conventional solutions are expensive, bulky, and heavy and therefore, there may be a desire to provide a solid-state transformer to save volume, weight, and cost.

The described embodiments pertain to the power electronic converter, the converter cell, the usage of a power electronic converter, the charger, and the wireless vehicle charging station. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a power electronic converter is provided comprising a plurality of converter cells. Each converter cell comprises an inductive power transfer stage, the inductive power transfer stage comprising an inductor coupling a first side of the converter cell to a second side of the converter cell, wherein the inductor comprises a first winding around a first magnetic core, the first winding being connected to the first side of the converter cell, and a second winding around a second magnetic core, the second winding connected to the second side of the converter cell. The first winding and the first magnetic core are separated from the second winding and second magnetic core by a flat electric insulation layer that provides electric insulation between the first and the second side of the converter cell. At least two of the coupled inductors are arranged in such a way that their insulation layers form a single contiguous insulation layer.

BRIEF DESCRIPTION OF THE SEVERAL VIEWS OF THE DRAWING(S)

FIG. 6b is a sectional view of the coupled inductor of FIG. 6a.

FIG. 8a is a front view, FIG. 8b is a top view.

FIG. 9 is a cross-sectional view of IPT inductors in a tank as shown in FIG. 8a.

DETAILED DESCRIPTION OF THE INVENTION

Figure 1:
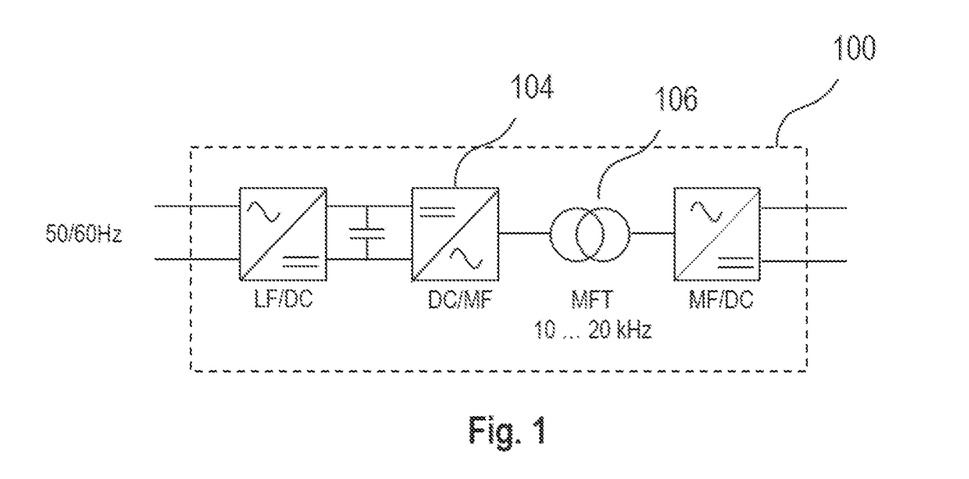
FIG. 1 is a block diagram of a solid state transformer (SST) cell in accordance with the disclosure.

FIG. 1 shows a block diagram of a solid state transformer (SST) cell. Along with the current and further expected strong growth of the number of electric vehicles, there is a strong growth in the market for charging infrastructure for electric vehicles. This market comprises fast car chargers that can be directly connected to the medium-voltage (MV) AC grid. For safety reasons, standards require galvanic separation by means of a transformer between the MV grid and the low-voltage (LV) output of the charger connectable to the electric vehicle. To reduce the cost, size, and weight of the charger, it is attractive to replace the conventionally used low-frequency transformer, operating at 50 or 60 Hz, by a solid-state transformer (SST) that comprises medium-frequency transformers (MFTs) 106 that operate at frequencies around 10 to 20 kHz. Without considering electric insulation, the reduction in transformer size, and correspondingly weight and cost, is dramatic, as it scales with the inverse of the frequency. While the transformer core shrinks with increasing frequency, this is not the case for the insulation distances. For high frequency and low power per transformer, the transformer size is dominated by the insulation distances between LV and HV winding, and between HV winding and core. A way around this is to ensure that the power per MFT 106 is sufficiently high, or, in other words, that the number of MFTs per charging system (of fixed total power) is sufficiently small. For high power per MFT the size increase due to insulation requirements is less pronounced.

Figure 2:
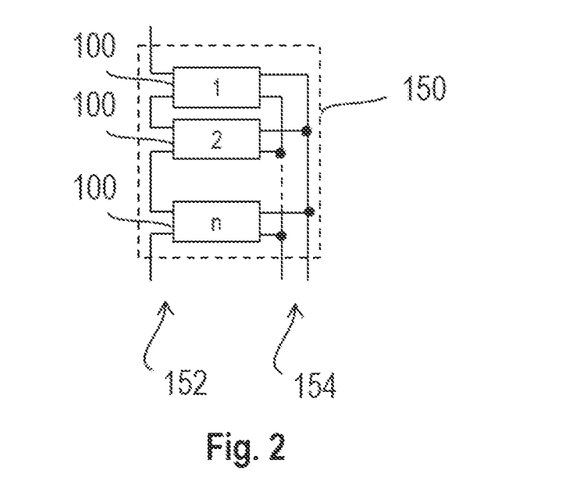
FIG. 2 is a block diagram of an SST branch in accordance with the disclosure.

As shown in FIG. 2, an SST 150 consists of individual converter cells 100 that are connected to a branch. The connection is in series on the MV side 152 and in parallel on the LV side 154. This way, the voltage is stepped down from the MV grid to a LV DC bus. Three branches are connected to the 3-phase MV AC grid in star or in delta. If the total power of the SST 150 (the charging system) is P, then the power per MFT is P/(3n), where n is the number of cells 100 per branch. For the MF inverter 104 of the SST cell 100, it is simplest and most economic to use a two-level topology, and semiconductors of not too high rated blocking voltage (due to cost). This leads to a relatively low DC voltage and input voltage per cell. As a consequence, many cells per branch are necessary to block the line-to-line voltage of the MV AC grid, and the power per MFT is low.

A numerical example is provided below:
Power per charging system: P=630 kW
rms line-to-line voltage of AC grid: $V_{LL}$=17.5 kV
Rated semiconductor blocking voltage: $V_{b,r}$=1.7 kV
Voltage usage factor of semiconductor (to achieve necessary reliability and lifetime):
$f_b$=62%.
DC voltage of SST cell: $V_{dc,cell}$=$f_b V_{b,r}$=1,060 V
Number of cells per branch (without redundancy) in case of star connection:

$$n=\mathrm{ceil}((\sqrt{2}V_{LL}/\sqrt{3})/V_{dc,cell})=14$$

Number of MFTs: N=3n=42
Power per MFT: $P_{MFT}$=P/N=15 kW

For the combination of the low power of 15 kW and the high insulation voltage of 17.5 kV it is hardly possible to design a compact and cost efficient MFT. Some improvement is possible by first connecting a 3-phase rectifier to the grid, and then connecting a single SST branch to the DC link of the 3-phase rectifier. The total number of cells and MFTs in this case is: N=n=ceil($\sqrt{2}V_{LL}/V_{dc,cell}$)=24. While this results in a somewhat higher power per MFT of $P_{MFT}$=P/N≅26.3 kW, it is still a challenge to design a compact and cost efficient MFT. The problem results from the insulation distances between HV winding and grounded core, since the core—a closed core in this case—is built around the HV winding. This leads to a poor usage of the core window.

Figure 3:
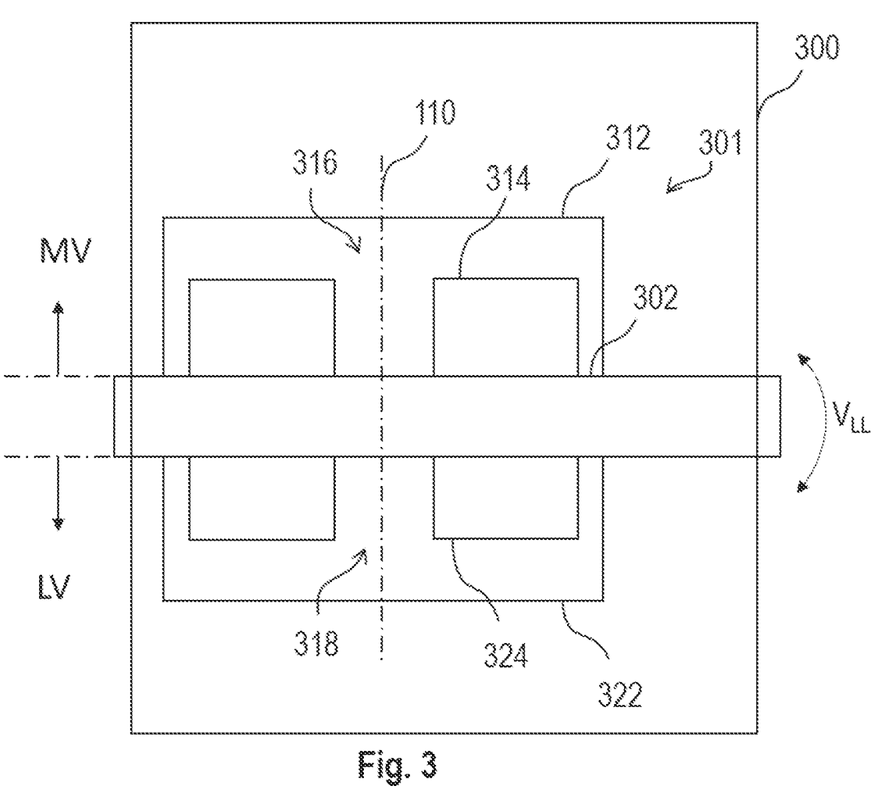
FIG. 3 is a block diagram of a coupled inductor in accordance with the disclosure.
Figure 4:
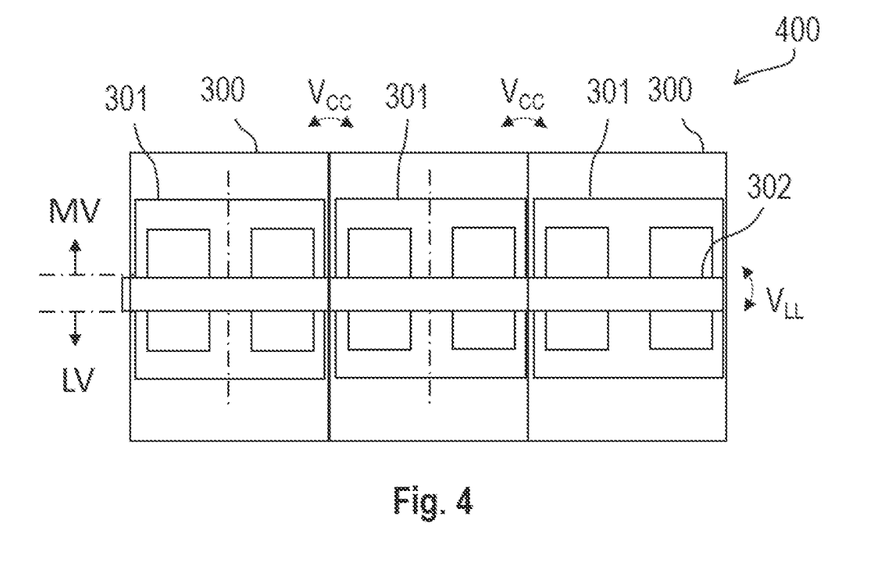
FIG. 4 is a block diagram of coupled inductors sharing the same flat insulation layer in accordance with the disclosure.

FIG. 3 shows a schematic diagram of a cross section of a coupled inductor 301 inside a converter cell 300 according to an embodiment. The inductor 301 comprises a first core half 312, a first winding 314, a second core half 322, a second winding 324, and an insulator 302. The cell 300 may comprise more components as described in FIG. 1. The first winding 314 is wound annularly around the center part 316 of the core half 312 with axis of rotation 110, i.e., the winding 314 lies horizontally with respect to the drawing in FIG. 3, around the center part 316 of the upper part of the inductor 301. Similarly, the second winding 324 is wound around a second core 322 annularly around the center part 316 of the core half 322, such that the core halves 312, 322 and the windings 314, 324 face each other. Such an arrangement is designated as pot core in this disclosure. The core material may be ferrite. The upper part 312, 314, may be the medium voltage side (MV), and the lower part 322, 324 may be the low voltage side (LV). Between the two sides MV and LV, the insulator 302 is arranged such that in operation a voltage $V_{LL}$ between the medium voltage side (MV) and the low voltage side (LV) arises. The insulator 302 may be a flat electric insulation layer 302 that provides electric insulation between the first and the second side of the converter cell 300. The insulation layer 302 is geometrically extended such that the converter cell 300 is enabled to share the insulation layer 302 with an adjacent converter cell as shown in FIG. 4 described further below.

In the illustrated embodiment, the core halves 312, 322 are on different potential and the electric insulation 302 is between the core halves 312, 322. Hence, the electric insulation 302 penetrates the magnetic circuit, or, in other words, the magnetic flux penetrates the electric insulation 302. The electric insulation 302 is a single, flat layer and is hence much simpler and can be more space saving than in case of a closed-core MFT.

Figure 5:
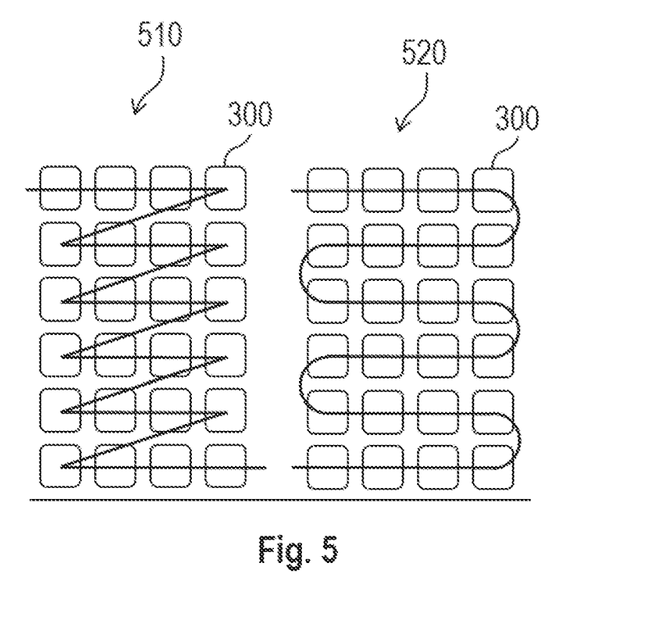
FIG. 5 is a schematic diagrams of cell connections schemes in accordance with the disclosure.

A total of N coupled inductors 301 is needed in the same way as N closed-core MFTs are needed, e.g. N=24 according to the example above. According to the present invention, the multitude of coupled inductors 301 is arranged in such a way that the inductors share the same flat insulation layer 302 as shown schematically in FIG. 4. Thereby, the insulation 302 retains the simplest possible shape, i.e. a single flat layer, and can be very space saving. Between adjacent coupled inductors 300, no strong insulation is needed, since the cell-to-cell voltage $V_{CC}$ between adjacent inductors 301 is much smaller than the system voltage $V_{LL}$ that needs to be insulated between the core halves 312 and 322, and the windings 314 and 324, of a coupled inductor 301. The maximum voltage between adjacent cells 300 depends on the connection scheme of the cells 300. The minimum $V_{CC}$=min(Nx, Ny) is obtained using the zigzag scheme 510 shown on the left in FIG. 5. The meandering scheme 520 shown on the right in FIG. 5 yields a higher $V_{CC}$, but shorter connections.

The above described arrangement corresponds to an IPT system with a multitude of series-parallel connected IPT cells. The IPT cells correspond to the cells 100 introduced in Section 2, where each closed-core MFT is replaced by a pair of coupled inductors 301. Because the insulation 302 penetrates the magnetic circuit, and the core has a much wider air gap than the closed-core MFTs, the magnetic coupling coefficient between the two windings is much lower than for a closed-core MFT. Therefore, the IPT system needs to be operated in a resonant mode with a compensation of the stray inductances.

Figure 6A:
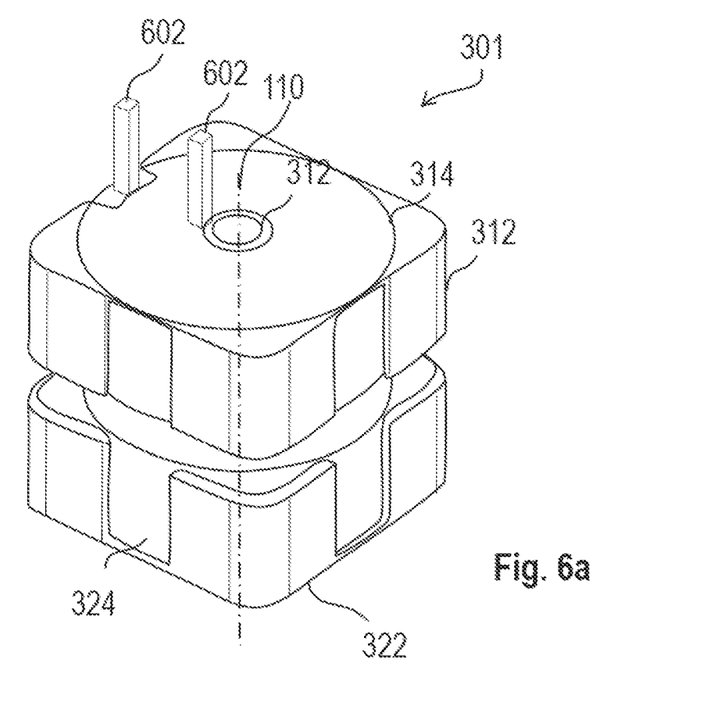
FIG. 6a is a 3-dimensional schematic diagram of a coupled inductor in accordance with the disclosure.
Figure 6B:
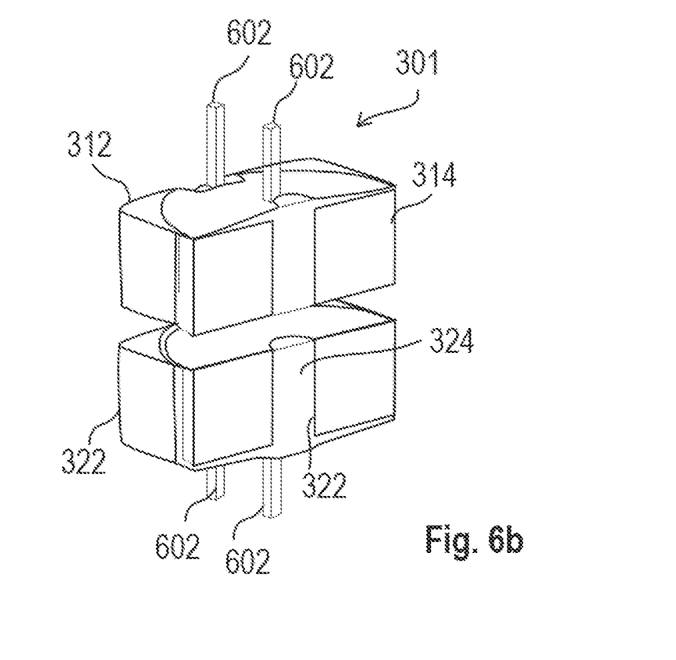

FIG. 6a shows possible design of an coupled inductor 301 in a 3-dimensional schematic diagram with first winding 314, second winding 324, first half core 312, second half core 322, conductors 602, and rotation axis 110. The insulator is not shown in the diagram. FIG. 6b illustrates a cross section of the coupled inductor 301 shown in FIG. 6a.

Figure 7:
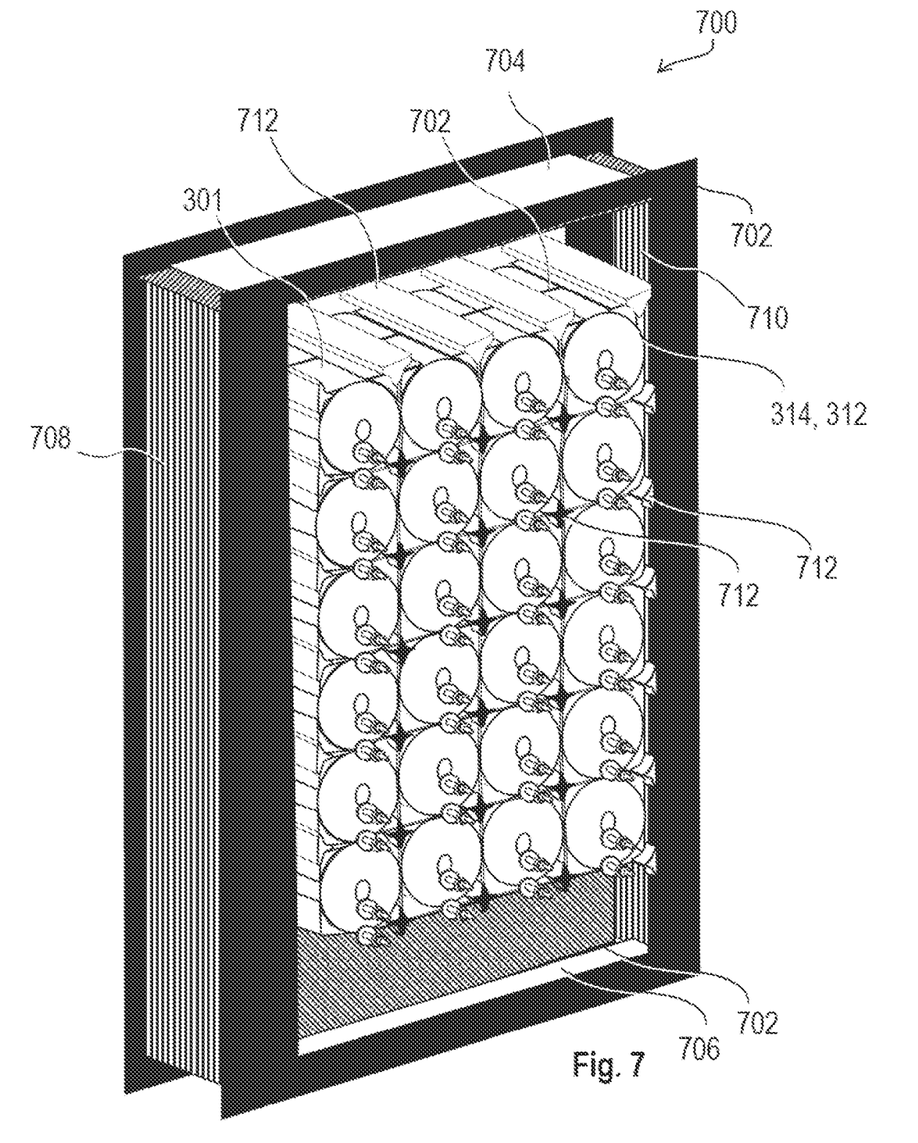
FIG. 7 is a schematic diagram of a front view and a side view of a tank for IPT inductors in accordance with the disclosure.

FIG. 7 shows a schematic 3-dimensional diagram of an example of an arrangement with a total of N=24 inductor pairs arranged as a 4×6 matrix.

The design has the following features:
The inductors 300 are immersed in oil. The arrangement of the 4×6 coupled inductors 301, or inductor pairs 301, respectively, is accommodated in a vertically upright tank 700.

Figure 8A:
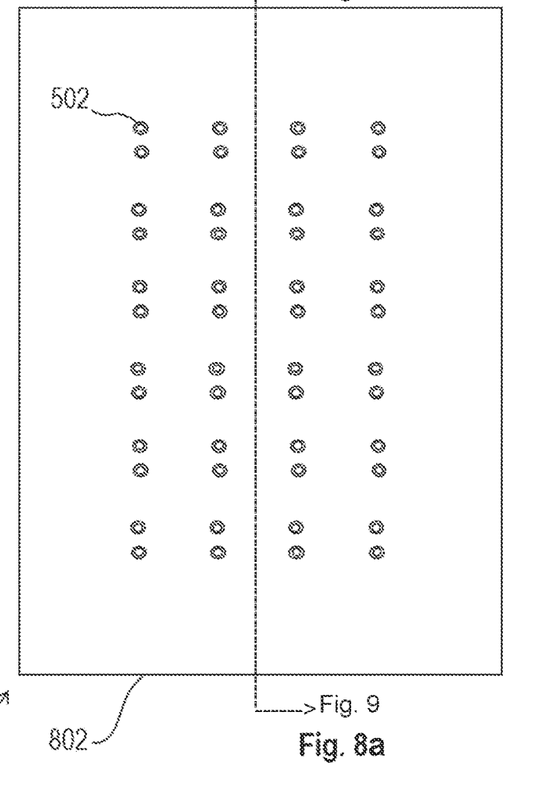
Figure 8B:
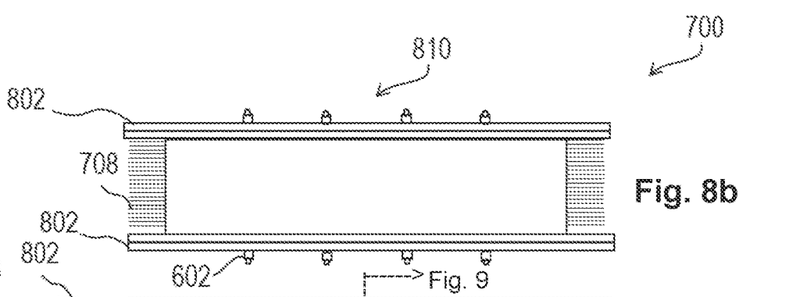
Figure 8C:
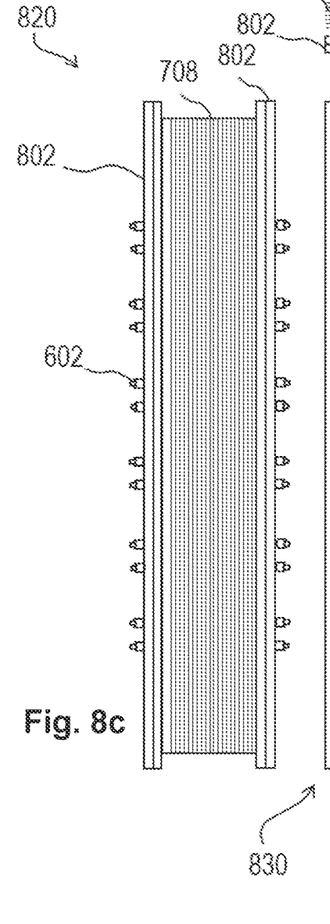
FIG. 8c is a side view of 3-dimensional schematic diagrams from different perspectives of IPT inductors in a tank in accordance with the disclosure.

Referring to FIG. 7 in combination with FIGS. 8a, 8b, and 8c, the tank consists of bushing plates 802 as shown in FIGS. 8a, 8b, and 8c, through which the connectors or conductors 602, respectively, are fed, and of a metal frame 702 providing top 704 and bottom 706 walls, and side walls with integrated cooling fins 708, 710 toward the inside and outside. The inner fins 710 effect the heat transfer from oil to wall, the outer fins 708 the heat transfer from the wall to ambient air. FIG. 8*b* shows the a top view 810, FIG. 8*c* shows a side view 820, and FIG. 8*a* shows a front view 830 of the tank 700.

A pressboard barrier 702 is used to keep the opposing core halves at a fixed, well defined insulation distance. Pressboard pins 712 are used to keep the core halves in place. Alternatively to pressboard 702, oil barriers from Nomex or any other suitable polymer can be used.

Figure 9:
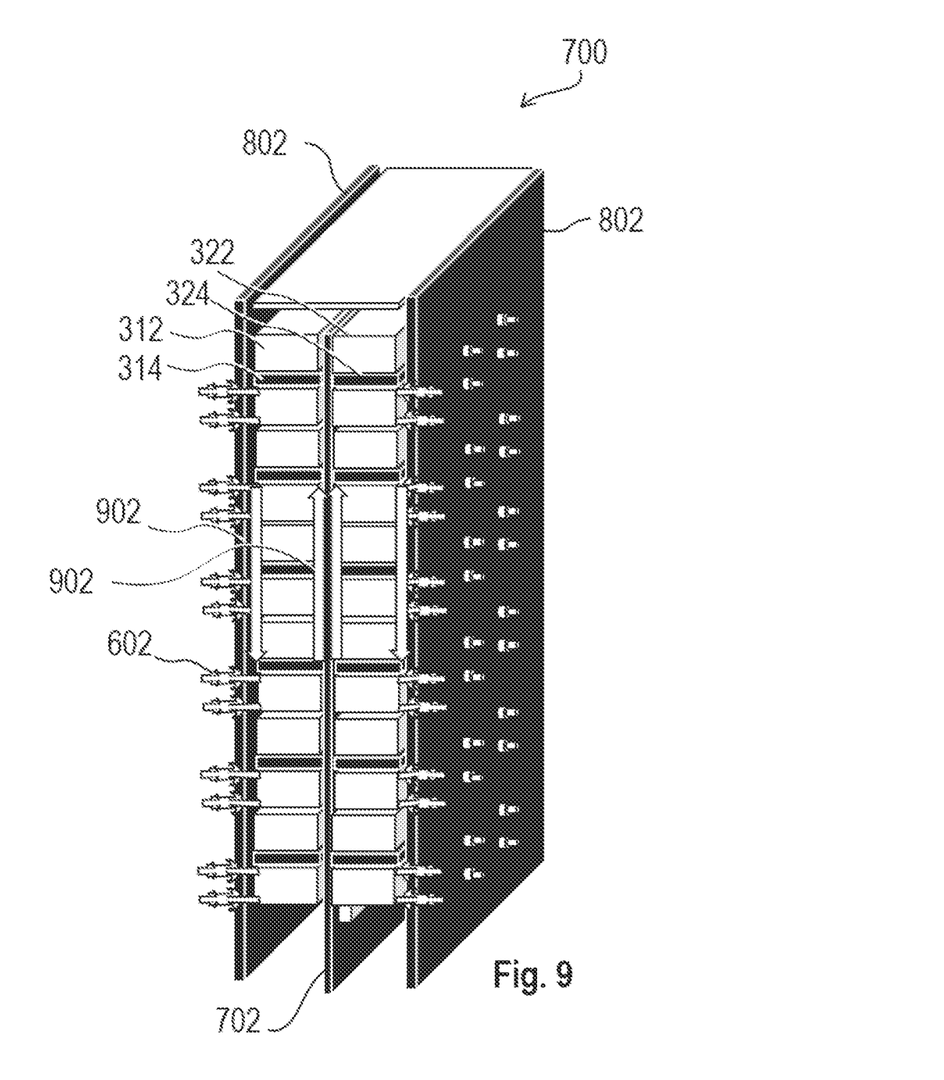

Oil circulation as indicated by arrows 902 in FIG. 9 takes places through natural convection, i.e., pump-less, upward along the coupled inductors, and downward through the inner fins of the tank. The dielectric fluid may be mineral oil, ester, or any other suitable fluid. In the example, an insulation thickness of 17.7 mm is provided, which is designed for an rms line-to-line AC voltage of $V_{LL}$=17.5 kV in case of usage of mineral oil and pressboard barriers. The windings may be made of litz wire.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

Having described an exemplary embodiment, in a general aspect, the present disclosure describes a power electronic converter, which may comprise a plurality of inductors. Each of these inductors is composed of two halves. The two halves lie face to face on each other separated by an insulator. The insulator is, however, not restricted in size to the area covered by the surfaces of the halves that face each other. Instead, the size of the insulator is extended such that one or more further inductors can use the same piece of insulator. The two inductor halves are part of a converter cell that may comprise further devices. That is, one inductor half is associated and connected to one side of converter cell and the other half is associated and connected to a second side of the converter cell.

The term "coupled inductor" relates to the two halves of the inductor, which is also designated "pair of inductors" in this disclosure. Further, "magnetic core" is designated as "core."

According to an embodiment, the converter cells are connected to each other on the first sides of the converter cells and on the second side of the converter cells, and wherein the connection on the first side is a series connection, and where the connection on the second side is a parallel connection. That is, the voltage on the first side, e.g., a medium voltage, is stepped down, whereas on the second side, e.g., a DC voltage is obtained which is equal to the DC voltage of the single cells after rectifying. The first side may be an input voltage and the second side an output voltage. The output energy with the DC voltage is hence supplied by currents from all cells of the converter. MV in this context means a line-to-line rms voltage typically in the range of 10 to 20 kV or higher, e.g., 50 kV.

According to an embodiment, the coupled inductors are arranged side-by-side within a plane of the insulation layer to form a rectangular pattern, or to form a matrix of coupled inductors. Either a single row or column of coupled inductors may use the same piece of insulator, also if they are arranged as a matrix, or all inductors may use the same piece of insulators, also when they are arranged as a matrix. That is, there may be one single insulator for all inductors of the converter, between the first halves and the second halves of the inductors. Thus, on one side a low volume can be achieved due to the use of inductor pairs, and on the other side, the effort for manufacturing the converter is reduced, since only inductor halves have to be produced. The first halves and the second halves may be assembled on a bushing plate in the same way, and finally the two bushing plates may be put together with the insulator in-between.

According to an embodiment, the coupled inductors are immersed in a dielectric liquid such as oil or ester. The dielectric liquid insulates, for example, the windings.

According to an embodiment, the power electronic converter comprises a tank that contains the dielectric liquid, wherein the tank comprises a first bushing plate from a dielectric material. The bushing plate is in a plane parallel to the insulation layer, and the bushing plate comprises bushings for connecting conductors to the first windings. Such an arrangement allows an easy and save connection of the inductors or windings, respectively, to the further components of the cell. The inductor halves mounted on the frame, or in more detail, the windings, may be connected to the connectors at the inside of the bushing plates in a first step. When the tank is assembled, the further components may be connected to the connectors at the outside of the bushing plate in a further step. Furthermore, the tank is filled with a dielectric liquid for insulation of the windings and for cooling by natural convection. The bushing plates are made of a dielectric material. In this way, the conductors can directly be attached to the bushing plates in order to connect the windings to the first or second side of each cell.

According to an embodiment, the tank comprising the matrix of coupled inductors immersed in a dielectric liquid is vertically oriented. That is, the bushing plates and the parallel insulation layer are also oriented vertically. By the vertical arrangement, the direction of the natural convection current is upwards along the insulation layer and the cores, and downwards along the tank wall, and there is no horizontal barrier that stops the dielectric liquid from flowing up- and downwards. Cooling fins at the inner side of the tank and (optionally) at the top receive the heat, which is transported to cooling fins at the outside of the tank.

In other words, a plane of the insulation layer contains the vertical direction, and the dielectric fluid such as oil flows upward through natural convection to cool the cores and the windings of the coupled inductors. The oil flows downward along a tank wall to transfer the heat to the ambient, providing passive cooling inside the tank.

According to an embodiment, the magnetic core of a winding is a pot core, receiving the circular winding in an annular groove of the core, and wherein the pot cores of the first and the second winding face each other with the insulation layer in-between. In other words, the windings enclose a cylindrical inner part, geometrically comprising the rotation axis of the core, and are themselves enclosed by an outer part of the core. Further, they are covered by a part on the top side, i.e. normal to the rotation axis, and are open on the bottom side in direction to the insulation layer and the counterpart of the core half, i.e., the second half. The directions "up" and "down" are used here for illustration purposes only, and may be changed according to an angle of aspect. The outer shape of the core may be circular, or rectangular, e.g., with rounded edges, or any other suitable shape.

According to an embodiment, the insulation layer comprises oil or an arrangement of oil and oil barriers, where the oil barriers are from an oil impregnated material such as pressboard, Nomex, or a polymer.

According to a further embodiment, the power electronic converter is configured to be connected to an MV grid with a line-to-line rms voltage of 1 to 50 kV.

According to a further embodiment, the insulator has an essentially flat shape. The essentially flat shape follows from the maximum distance between two core halves and the arrangement of the coupled inductors, for example, as a matrix in the tank, wherein the distances between coupled insulators are small, and the insulation layer is a common insulation layer.

According to a second aspect, a converter cell is provided. The converter cell comprises an inductive power transfer stage, wherein the inductive power transfer stage comprises an inductor coupling a first side of the converter cell to a second side of the converter cell. The inductor comprises a first winding around a first magnetic core, the first winding being connected to the first side of the converter cell and a second winding around a second magnetic core, the second winding connected to the second side of the converter cell. The first winding and the first magnetic core are separated from the second winding and second magnetic core by an insulation layer that provides electric insulation between the first and the second side of the converter cell. The insulation layer is geometrically extended such that the converter cell is enabled to share the insulation layer with an adjacent converter cell. That is, the converter cell is a cell whose inductors and cell sides comprising connections are configured such that they are suited for assembling a power electronic converter as described above. For example, the coupled inductor is integrated in a tank of the power electronic converter comprising an extended insulation layer, which it shares with one or more adjacent coupled inductors of further cells. The cells may comprise any of the features described above relating to cells of the power electronic converter.

According to a third aspect, a usage of a power electronic converter as described above for a vehicle charging station is provided. That is, the power electronic converter is used to charge a vehicle connected to a vehicle charging station comprising the power electronic converter.

According to a fourth aspect, a charger comprising a power electronic converter as described above is provided.

According to a fifth aspect, a wireless vehicle charging station comprising a power electronic converter is provided. The vehicle charging station may hence be a wireless charging station. However it may alternatively be a wired charging station.

Therefore, according to the present invention, the volume, weight, and cost of the galvanically insulated power conversion stage is reduced by replacing the closed-core MFTs by, e.g., a matrix arrangement of inductive-power transfer (IPT) cells. The cells share a common, planar insulation layer, which minimizes the space needed for electrical insulation.

These and other features, aspects and advantages of the present invention will become better understood with reference to the accompanying figure and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power electronic converter, comprising:
a plurality of converter cells, wherein each converter cell comprises:
an inductive power transfer stage comprising a coupled inductor that couples a first side of the converter cell to a second side of the converter cell, wherein the coupled inductor comprises
a first winding disposed around a first magnetic core, the first winding being connected to the first side of the converter cell, and
a second winding disposed around a second magnetic core, the second winding being connected to the second side of the converter cell;
wherein the first winding and the first magnetic core are separated from the second winding and second magnetic core by a flat electric insulation layer that provides electric insulation between the first and the second side of the converter cell;
wherein at least two of the coupled inductors are arranged in such a way that their insulation layers form a single contiguous insulation layer; and
wherein the coupled inductors are arranged side-by-side within a plane of the insulation layer to form a matrix of converter cells comprising at least two columns of converter cells and at least two rows of converter cells, wherein the converter cells are connected according to a zigzag connection scheme or a meandering connection scheme.

2. The power electronic converter according to claim 1, wherein the converter cells are connected to each other on their respective first side and on their respective second side, and wherein the connection on the first side is a series connection, and wherein the connection on the second side is a parallel connection.

3. The power electronic converter according to claim 1, wherein the coupled inductors are further arranged side-by-side within a plane of the insulation layer to form a rectangular pattern.

4. The power electronic converter according to claim 1, wherein the coupled inductors are further arranged side-by-side within a plane of the insulation layer to form a matrix of coupled inductors.

5. The power electronic converter according to claim 1, wherein the coupled inductors are immersed in a dielectric liquid.

6. The power electronic converter according to claim 5, wherein the dielectric liquid is oil or ester.

7. The power electronic converter according to claim 5, further comprising a tank that contains the dielectric liquid, wherein the tank comprises a first bushing plate made from a dielectric material.

8. The power electronic converter according to claim 7, wherein the bushing plate is disposed along a plane that is parallel to the insulation layer.

9. The power electronic converter according to claim 7, wherein the bushing plate comprises bushings for connecting conductors to the first windings.

10. The power electronic converter according to claim 7, wherein the tank contains a matrix of coupled inductors immersed in the dielectric liquid, and wherein the matrix of coupled conductors is vertically oriented.

11. The power electronic converter according to claim 1, wherein the magnetic core of a winding is a pot core, receiving the circular winding in an annular groove of the core, and wherein the pot cores of the first and the second windings face each other with the insulation layer disposed in-between.

12. The power electronic converter according to claim 1, wherein the insulation layer comprises at least one of oil and an arrangement of oil and oil barriers.

13. The power electronic converter according to claim 12, wherein the oil barriers are made from an oil impregnated material.

14. The power electronic converter according to claim 13, wherein the oil impregnated material is Nomex, or a polymer.

15. The power electronic converter according to claim 1, wherein the power electronic converter is configured to be connected to a medium voltage (MV) grid with a line-to-line (root mean square) rms voltage of 1 to 50 kV.

16. The power electronic converter according to claim 1, wherein the insulator has an essentially flat shape.

17. A converter cell, comprising:
an inductive power transfer stage, the inductive power transfer stage comprising an inductor coupling a first side of the converter cell to a second side of the converter cell, wherein the inductor comprises a first winding disposed around a first magnetic core, the first winding being connected to the first side of the converter cell and a second winding disposed around a second magnetic core, the second winding being connected to the second side of the converter cell;
wherein the first winding and the first magnetic core are separated from the second winding and the second magnetic core by an insulation layer that provides electric insulation between the first side of the converter cell and the second side of the converter cell;
wherein the insulation layer is geometrically extended such that the converter cell is shares the insulation layer with an adjacent converter cell; and
wherein the coupled inductor is arranged side-by-side to a further coupled inductor within a plane of the insulation layer such that the coupled inductor is part of a matrix of converter cells comprising at least two columns of converter cells and at least two rows of converter cells, wherein the converter cells are connected according to a zigzag connection scheme or a meandering connection scheme.

18. The converter cell according to claim 17, wherein the converter cells in the matrix are connected to each other on their respective first side and on their respective second side, and wherein the connection on the first side is a series connection, and wherein the connection on the second side is a parallel connection.

19. The converter cell according to claim 18, wherein the converter cells in the matrix are further arranged side-by-side within a plane of the insulation layer to form a rectangular pattern.

20. The converter cell according to claim 19, further comprising a tank that contains the matrix of converter cells immersed in a dielectric liquid, and wherein the matrix of converter cells is vertically oriented.

* * * * *